(12) United States Patent
Fujiwara et al.

(10) Patent No.: US 10,479,409 B2
(45) Date of Patent: Nov. 19, 2019

(54) VEHICLE-BODY FRONT STRUCTURE

(71) Applicant: SUBARU CORPORATION, Tokyo (JP)

(72) Inventors: Seiji Fujiwara, Tokyo (JP); Yosuke Hachisu, Tokyo (JP); Kenichi Takeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/022,855

(22) Filed: Jun. 29, 2018

(65) Prior Publication Data

US 2019/0016390 A1 Jan. 17, 2019

(30) Foreign Application Priority Data

Jul. 13, 2017 (JP) ................. 2017-137467

(51) Int. Cl.
*B62D 21/15* (2006.01)
*B62D 25/08* (2006.01)

(52) U.S. Cl.
CPC ............ *B62D 21/155* (2013.01); *B62D 25/08* (2013.01)

(58) Field of Classification Search
CPC ................................................... B62D 21/155
USPC ................................ 296/187.1, 187.09, 204
See application file for complete search history.

(56) References Cited

U.S. PATENT DOCUMENTS

| | | | | |
|---|---|---|---|---|
| 8,888,168 B2 * | 11/2014 | Kuwabara | ............ | B62D 25/082 296/187.09 |
| 9,242,675 B2 * | 1/2016 | Kuriyama | ............ | B62D 25/082 |
| 2003/0094803 A1 * | 5/2003 | Fujiki | ................. | B62D 21/155 280/784 |
| 2011/0316295 A1 * | 12/2011 | Yamada | ................ | B62D 21/11 293/132 |
| 2012/0049571 A1 * | 3/2012 | Katou | ................. | B62D 21/152 296/187.09 |

(Continued)

FOREIGN PATENT DOCUMENTS

JP 58-035471 4/1983
JP 2013-220789 A 10/2013

(Continued)

OTHER PUBLICATIONS

Decision to Grant a Patent dated Dec. 4, 2018 for Japanese Application No. 2017-137467.

*Primary Examiner* — Jason S Morrow
(74) *Attorney, Agent, or Firm* — Troutman Sanders LLP

(57) ABSTRACT

A vehicle-body front structure includes a pair of left and right side frames, a cross member, a pair of sub-frames, projections, and buckling structures. The pair of left and right side frames extend in a front-rear direction. The cross member is coupled to a lower side of the pair of left and right side frames and extends in a left-right direction. The pair of sub-frames are coupled to a lower side of the cross member and extend in the front-rear direction. Each projection is disposed on a front end side of the corresponding sub-frame and projects from the corresponding side frame outward in the left-right direction in a plan view. Each buckling structure is formed in the corresponding sub-frame and causes the sub-frame to buckle such that the corresponding projection comes into contact with the cross member when an impact load is applied to the projection from a front side.

18 Claims, 4 Drawing Sheets

(56) References Cited

U.S. PATENT DOCUMENTS

| | | | | |
|---|---|---|---|---|
| 2012/0248820 | A1* | 10/2012 | Yasui | B60R 19/34 |
| | | | | 296/187.09 |
| 2014/0239671 | A1* | 8/2014 | Mori | B62D 21/152 |
| | | | | 296/187.09 |
| 2014/0300136 | A1* | 10/2014 | Garnweidner | B62D 21/155 |
| | | | | 296/187.09 |
| 2015/0274209 | A1* | 10/2015 | Basappa | B60R 19/26 |
| | | | | 180/271 |
| 2016/0121932 | A1* | 5/2016 | Suzuki | B62D 21/152 |
| | | | | 296/187.09 |
| 2016/0236718 | A1* | 8/2016 | Tatsuwaki | B62D 21/155 |
| 2017/0274934 | A1* | 9/2017 | Elliott | B62D 21/152 |

FOREIGN PATENT DOCUMENTS

| | | |
|---|---|---|
| JP | 2013-256266 | 12/2013 |
| JP | 2016-049811 A | 4/2016 |
| JP | 2017-065439 A | 4/2017 |

\* cited by examiner

VEHICLE-BODY FRONT STRUCTURE

CROSS-REFERENCE TO RELATED APPLICATIONS

The present application claims priority from Japanese Patent Application No. 2017-137467 filed on Jul. 13, 2017, the entire contents of which are hereby incorporated by reference.

BACKGROUND

1. Technical Field

The present invention relates to a vehicle-body front structure including a pair of left and right side frames extending in a front-rear direction, a cross member that is coupled to the lower side of the pair of left and right side frames and that extends in a left-right direction, and a pair of sub-frames that are coupled to the lower side of the cross member and that extend in the front-rear direction.

2. Related Art

A proposed vehicle-body front structure includes side frames, a suspension member, a radiator support, and coupling members (see Japanese Unexamined Patent Application Publication (JP-A) No. 2013-256266). The side frames are disposed outside a power unit in the width direction of a vehicle and extend in the front-rear direction of the vehicle, and the power unit is disposed on a vehicle-body front side. The suspension member is disposed on the rear side of the power unit in the front-rear direction of the vehicle. The radiator support is disposed on the front side of the power unit in the front-rear direction of the vehicle, extends in the width direction of the vehicle, and supports a radiator on the lower side, and ends of the radiator support in the width direction of the vehicle project from the corresponding side frames in the width direction of the vehicle. The coupling members are disposed outside of the power unit in the width direction of the vehicle, couple the radiator support and the suspension member to each other in the front-rear direction of the vehicle inside the respective ends of the radiator support in the width direction of the vehicle. Each coupling member includes a load transmission unit that enables a part of a load applied to the corresponding end of the radiator support toward the rear of the vehicle to be transmitted to the power unit inward in the width direction of the vehicle.

With the vehicle-body front structure, a collision object collides one of the ends of the radiator support in the width direction of the vehicle in a small overlap collision, and an impact load is applied to the end of the radiator support toward the rear of the vehicle. A part of the impact load is transmitted to the corresponding coupling member as a bending moment and is transmitted from the load transmission unit to the power unit inward in the width direction of the vehicle.

SUMMARY OF THE INVENTION

An aspect of the present invention provides a vehicle-body front structure including a pair of left and right side frames extending in a front-rear direction, a cross member that is coupled to a lower side of the pair of left and right side frames and that extends in a left-right direction, a pair of sub-frames that are coupled to a lower side of the cross member and that extend in the front-rear direction, projections each of which is disposed on a front end side of the corresponding sub-frame and projects from the corresponding side frame outward in the left-right direction in a plan view, and buckling structures each of which is formed in the corresponding sub-frame and causes the sub-frame to buckle such that the corresponding projection comes into contact with the cross member when an impact load is applied to the projection from a front side.

With the vehicle-body front structure, an impact load is applied to the corresponding projection of a vehicle from a collision object that moves toward the rear side in a small overlap collision. At this time, the corresponding sub-frame buckles, the projection comes into contact with the cross member, and a load is applied between the collision object and the vehicle in the left-right direction away therefrom. Thus, the vehicle can be moved so as to deviate from the direction in which the collision object moves.

DETAILED DESCRIPTION

In the following, an example of the present invention is described with reference to the accompanying drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the case of the vehicle-body front structure disclosed in JP-A No. 2013-256266, the impact load is transmitted from the end of the radiator support located on the outer side to the power unit located on the inner side relatively distant therefrom. Accordingly, it is difficult for the impact load to be efficiently transmitted inward in the left-right direction.

It is desirable to provide a vehicle-body front structure that enables an impact load to be efficiently transmitted inward in the left-right direction in a small overlap collision.

Figure 1:
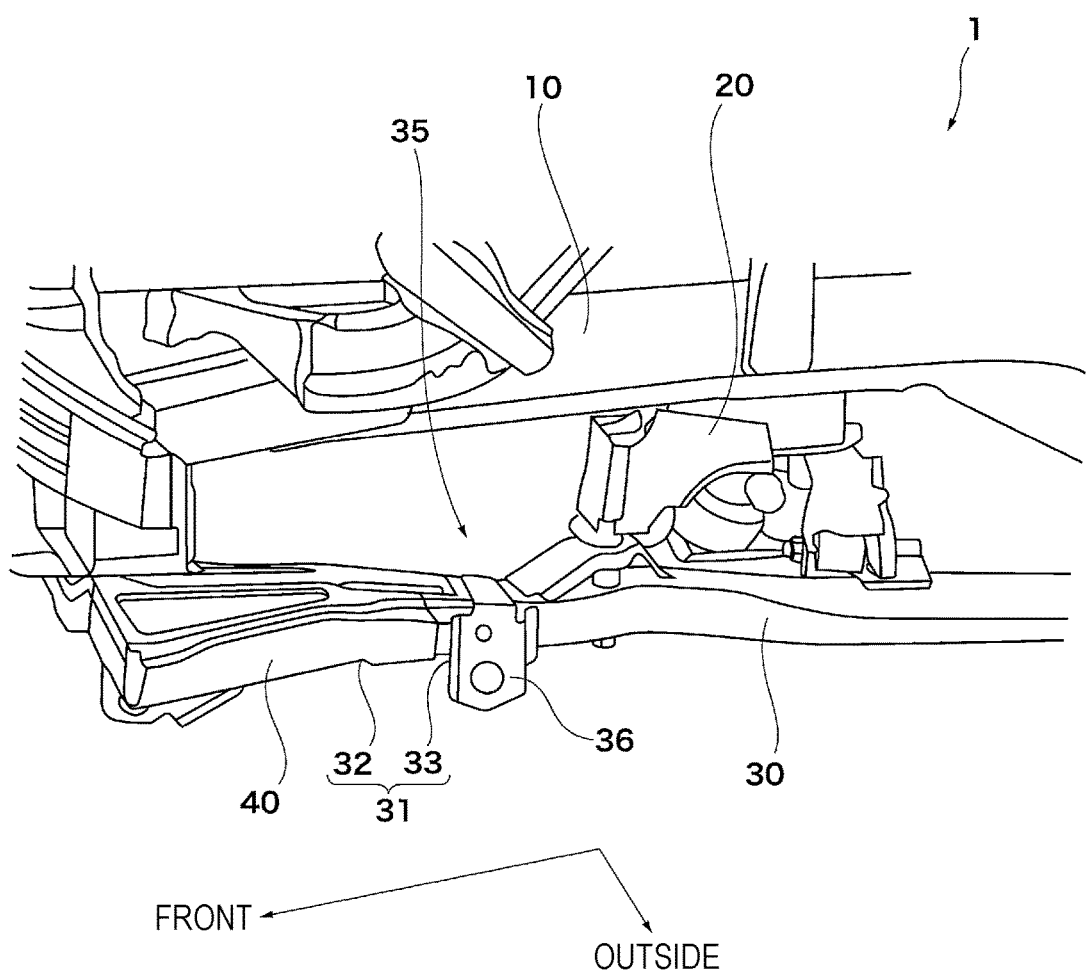
FIG. 1 is a schematic perspective view of a vehicle-body front structure according to an example of the present invention.
Figure 2:
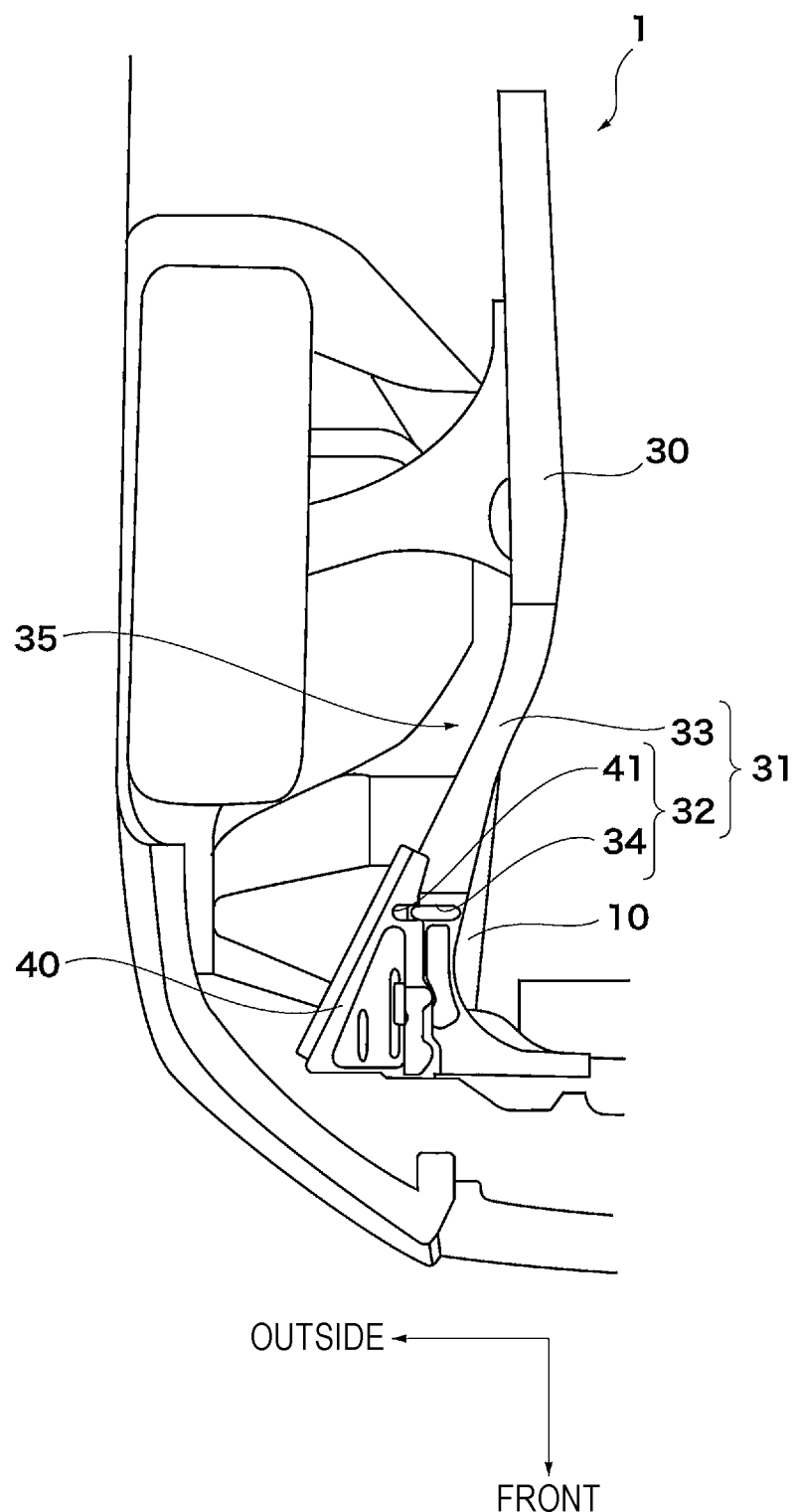
FIG. 2 is a schematic bottom view of the vehicle-body front structure.
Figure 3A:
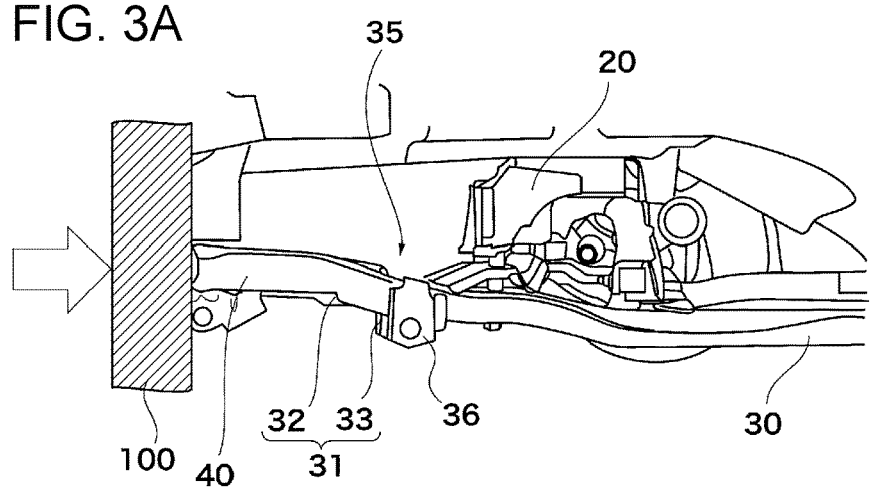
FIG. 3A is a perspective view of one of sub-frames and illustrates deformation of the sub-frame in the early stage of a small overlap collision.
Figure 3B:
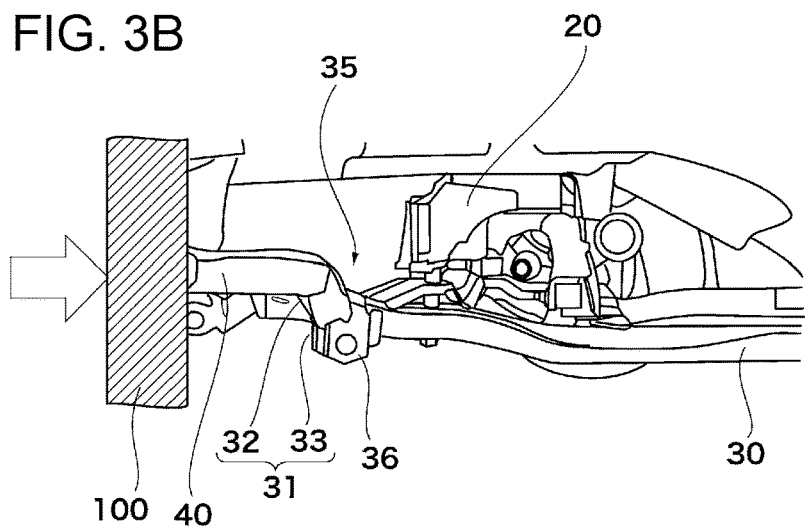
FIG. 3B is a perspective view of the sub-frame and illustrates the deformation of the sub-frame in the small overlap collision after a collision object has moved to the rear side to a certain extent.
Figure 3C:
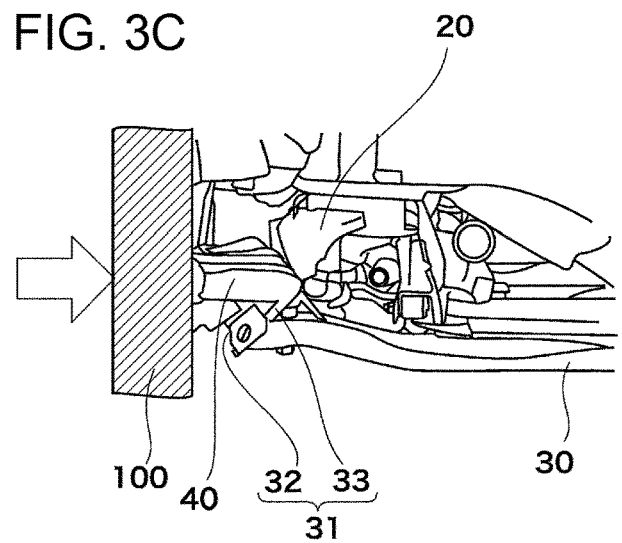
FIG. 3C is a perspective view of the sub-frame and illustrates the deformation of the sub-frame in the small overlap collision with a projection in contact with a cross member.
Figure 4:
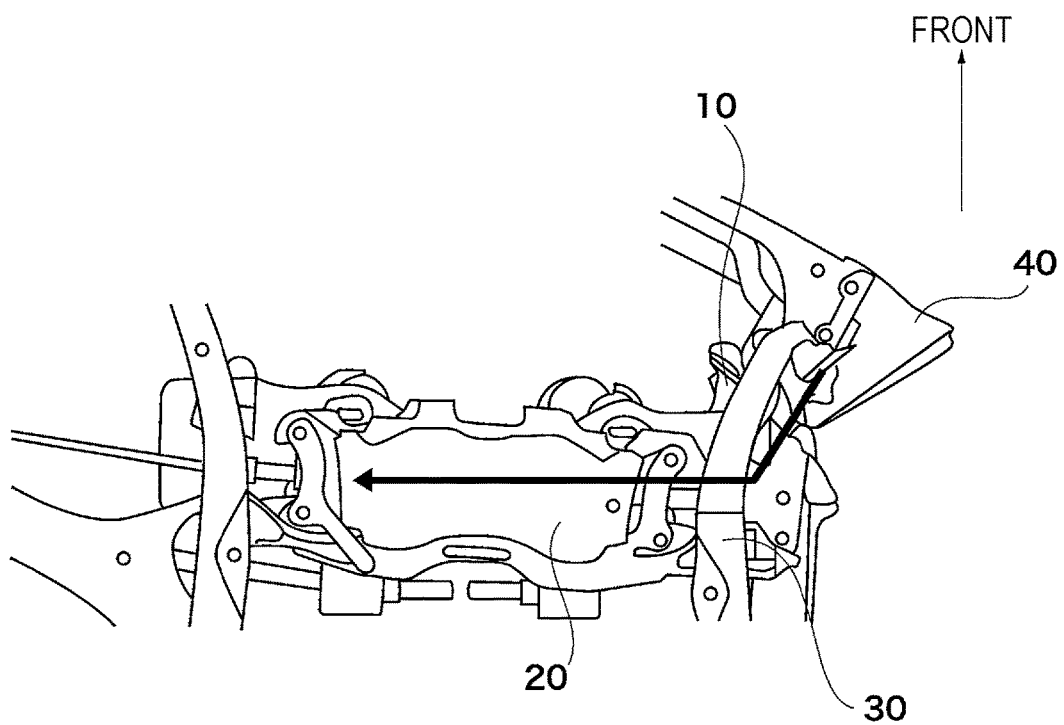
FIG. 4 is a bottom view of the sub-frame and illustrates the deformation of the sub-frame in the small overlap collision with the projection in contact with the cross member.

FIG. 1 to FIG. 4 illustrate an example of the present invention. FIG. 1 is a schematic perspective view of a vehicle-body front structure. FIG. 2 is a schematic bottom view of the vehicle-body front structure. FIG. 3A is a perspective view of one of sub-frames and illustrates deformation of the sub-frame in the early stage of a small overlap collision. FIG. 3B is a perspective view of the sub-frame and illustrates the deformation of the sub-frame in the small overlap collision after a collision object has moved to the rear side to a certain extent. FIG. 3C is a perspective view of the sub-frame and illustrates the deformation of the sub-frame in the small overlap collision with a projection in contact with a cross member. FIG. 4 is a bottom view of the sub-frame and illustrates the deformation of the sub-frame in the small overlap collision with the projection in contact with the cross member.

As illustrated in FIG. 1, a vehicle body 1 is formed, for instance, in a manner in which panel members formed from steel sheets by press molding are integrated and joined by, for instance, spot welding. The vehicle body 1 includes a pair of left and right side frames 10 extending in the front-rear direction on a vehicle front side, a cross member 20 that is coupled to the lower side of the part of left and right side frames 10 and that extends in the left-right direction, a pair of sub-frames 30 that are coupled to the lower side of the cross member 20 and that extend in the front-rear direction, and projections 40 each of which is disposed on the front end side of the corresponding sub-frame 30 and projects outward in the left-right direction. The cross member 20 is equipped with a power unit with, for instance, an engine mount interposed therebetween. Arms of suspensions are mounted on the sub-frames 30 with, for instance, bushings and brackets interposed therebetween. According to the example, the position of each side frame 10 in the left-right direction substantially coincides with the position of the corresponding sub-frame 30 in the left-right direction.

Each sub-frame 30 is coupled to the corresponding side frame 10 on the front end side and coupled to a floor, not illustrated, of the vehicle body on the rear end side. A certain section of the sub-frame 30 inclines downward from the front side toward the rear side. According to the example, a section of the sub-frame 30 from a joint between the sub-frame 30 and the side frame 10 to a joint between the sub-frame 30 and the cross member 20 inclines downward from the front side toward the rear side. That is, the front end of the sub-frame 30 is located at a higher position than the position of the joint between the sub-frame 30 and the cross member 20. According to the example, as illustrated in FIG. 2, a section of the sub-frame 30 from the joint between the sub-frame 30 and the side frame 10 to the joint between the sub-frame 30 and the cross member 20 inclines inward in the left-right toward the rear side.

As illustrated in FIG. 2, each projection 40 has a substantially triangle shape the width of which gradually decreases toward the rear side in a bottom view. The projection 40 projects from the corresponding side frame 10 outward in the left-right direction. In a small overlap collision, an impact load from a collision object 100 (see FIGS. 3A to 3C) is applied mainly to the projection 40. The corresponding sub-frame 30 buckles such that the sub-frame 30 bends upward and downward when the impact load is applied to the projection 40 from the front side.

As illustrated in FIG. 1, each sub-frame 30 includes a buckling structure 31 that causes the sub-frame 30 to buckle such that the corresponding projection 40 comes into contact with the cross member 20 when an impact load is applied to the projection 40 from the front side. The buckling structure 31 includes a first buckling member 32 that is formed on the sub-frame 30 near the rear end of the projection 40 and that causes the sub-frame 30 to bend such that the sub-frame 30 projects upward, and a second buckling member 33 that is formed on the sub-frame 30 between the first buckling member 32 and the joint between the sub-frame 30 and the cross member 20 and that causes the sub-frame 30 to bend such that the sub-frame 30 projects downward.

According to the example, the first buckling member 32 is disposed about midway between the front end of the sub-frame 30 and the joint between the sub-frame 30 and the cross member 20. The first buckling member 32 includes a notch 41 formed on the inner side in the left-right direction and the lower and rear side of the projection 40, and a bead 34 that is formed on the lower surface of the sub-frame 30 inside the notch 41 in the left-right direction and that extends in the left-right direction. According to the example, the notch 41 and the bead 34 form a fragile part that is more fragile than a front-side part and a rear-side part.

The second buckling member 33 includes a rigidity-varying part 35 at which a rigidity gradually increases toward the rear side. According to the example, a tie down hook 36 is disposed adjacent to the joint between the sub-frame 30 and the cross member 20 on the front side, and the front end of the tie down hook 36 forms the rigidity-varying part 35.

With the vehicle-body front structure described above, as illustrated in FIG. 3A, an impact load is applied to the corresponding projection 40 of the vehicle from the collision object 100 that moves toward the rear side in a small overlap collision. When the impact load is applied, the first buckling member 32 of the corresponding sub-frame 30 bends from the notch 41 and the bead 34 forming the fragile part such that the first buckling member 32 projects upward, and the second buckling member 33 bends from the rigidity-varying part 35 such that the second buckling member 33 projects downward.

According to the example, the joint between the cross member 20 and the tie down hook 36 having a relatively high rigidity continuously extends. Accordingly, even when the collision object 100 moves toward the rear side as illustrated in FIG. 3B, a part of the sub-frame 30 behind the rigidity-varying part 35 can be inhibited from being deformed. A section of the sub-frame 30 between the first buckling member 32 and the second buckling member 33 rotationally moves toward the rear side about the second buckling member 33. Consequently, the front of the sub-frame 30 and the projection 40 move toward nearly the rear side.

As illustrated in FIG. 3C, when the collision object 100 further moves toward the rear side, the front of the sub-frame 30 and the projection 40 come into contact with the cross member 20 diagonally from the front side and outside in the left-right direction. At this time, as illustrated in FIG. 4, the impact load is transmitted to the cross member 20 from the sub-frame 30 that has buckled and the projection 40, and a load is applied between the collision object 100 and the vehicle in the left-right direction away therefrom. Thus, the vehicle can be moved so as to deviate from the direction in which the collision object 100 moves.

The width of each projection 40 gradually decreases toward the rear side. For this reason, as illustrated in FIG. 4, when the impact load is applied from the collision object 100 that moves toward the rear side, the front end of the projection 40 swings about the rear end outward in the left-right direction in a bottom view. According to the example, the projection 40 has a substantially triangle shape. For this reason, the front end of the projection 40 swings about the vertex of the rear end of the projection 40 outward in the left-right direction. Accordingly, in a collision, a deformation mode can be appropriately controlled, and the load can be appropriately transmitted from the projection 40 to the cross member 20.

Thus, the vehicle-body front structure enables the impact load to be transmitted to the cross member 20 with certainty in a manner in which the front of the sub-frame 30 bends upward and downward in a small overlap collision, and the front of the sub-frame 30 and the projection 40 come into contact with the cross member 20 on the rear side. Accordingly, the impact load can be efficiently transmitted inward in the left-right direction in the small overlap collision. The fragile parts are arranged in the left-right direction between the projections 40 and the sub-frames 30 and accordingly enable the sub-frames 30 to bend with certainty. The notch is formed on the inner side in the left-right direction and the rear side of the projection 40 and accordingly helps the front end of the projection 40 swing outward in the left-right direction.

According to the example, the first buckling member 32 is disposed about midway between the front end of the sub-frame 30 and the joint between the sub-frame 30 and the cross member 20. Accordingly, the sub-frame 30 is relatively easy to bend, and the balance between the dimension of the projection 40 in the front-rear direction and a backward movement stroke of the projection 40 in a collision, for instance, can be ensured.

According to the example, the fragile part of the first buckling member 32 is formed of the notch 41 of the projection 40 and the bead 34 of the sub-frame 30. However, the fragile part may be, for instance, a hole, and the structure of the fragile part can be appropriately changed. The first buckling member 32 may include the rigidity-varying part 40 instead of the fragile part. Similarly, the second buckling member 33 may include the fragile part instead of the rigidity-varying part 35.

According to the example, the projection 40 has a substantially triangle shape in a plan view. However, the shape of the projection 40, for instance, can be appropriately changed in accordance with the required performance. For instance, the projection 40 may have a substantially quadrilateral shape in a plan view, and the projection 40 may be caused to swing in two stages in a collision to increase a load transmitted to the cross member 20. In this case, when the width of the projection 40 gradually decreases toward the rear side, the front end of the projection 40 is likely to swing about the rear end outward in the left-right direction in the collision.

The example of the present invention is described above. The above example, however, does not limit the invention recited in claims. It is to be noted that all of the combinations of features described according to the example are not necessarily essential.

The invention claimed is:

1. A vehicle-body front structure comprising:
   a pair of left and right side frames extending in a front-rear direction;
   a cross member that is coupled to a lower side of the pair of left and right side frames and that extends in a left-right direction;
   a pair of sub-frames that are coupled to a lower side of the cross member and that extend in the front-rear direction;
   projections each of which is disposed on a front end side of the corresponding sub-frame and projects from the corresponding side frame outward in the left-right direction in a plan view; and
   buckling structures each of which is formed in the corresponding sub-frame and causes the sub-frame to buckle such that the corresponding projection comes into contact with the cross member when an impact load is applied to the projection from a front side.

2. The vehicle-body front structure according to claim 1, wherein a width of each projection gradually decreases toward a rear side in a plan view.

3. The vehicle-body front structure according to claim 2, wherein each projection has a substantially triangle shape in a plan view.

4. The vehicle-body front structure according to claim 1, wherein a front end of each sub-frame is located at a higher position than a position of a joint between the sub-frame and the cross member, and each sub-frame buckles such that the sub-frame bends upward and downward when the impact load is applied to the corresponding projection from the front side.

5. The vehicle-body front structure according to claim 2, wherein a front end of each sub-frame is located at a higher position than a position of a joint between the sub-frame and the cross member, and each sub-frame buckles such that the sub-frame bends upward and downward when the impact load is applied to the corresponding projection from the front side.

6. The vehicle-body front structure according to claim 3, wherein a front end of each sub-frame is located at a higher position than a position of a joint between the sub-frame and the cross member, and each sub-frame buckles such that the sub-frame bends upward and downward when the impact load is applied to the corresponding projection from the front side.

7. The vehicle-body front structure according to claim 4, wherein each buckling structure comprises a first buckling member that is formed on the corresponding sub-frame near a rear end of the corresponding projection and that causes the sub-frame to bend such that the sub-frame projects upward, and a second buckling member that is formed on the sub-frame between the first buckling member and the corresponding joint and that causes the sub-frame to bend such that the sub-frame projects downward.

8. The vehicle-body front structure according to claim 5, wherein each buckling structure comprises a first buckling member that is formed on the corresponding sub-frame near a rear end of the corresponding projection and that causes the sub-frame to bend such that the sub-frame projects upward, and a second buckling member that is formed on the sub-frame between the first buckling member and the corresponding joint and that causes the sub-frame to bend such that the sub-frame projects downward.

9. The vehicle-body front structure according to claim 6, wherein each buckling structure comprises a first buckling member that is formed on the corresponding sub-frame near a rear end of the corresponding projection and that causes the sub-frame to bend such that the sub-frame projects upward, and a second buckling member that is formed on the sub-frame between the first buckling member and the corresponding joint and that causes the sub-frame to bend such that the sub-frame projects downward.

10. The vehicle-body front structure according to claim 7, wherein each first buckling member comprises a fragile part that is more fragile than a front-side part and a rear-side part, and
wherein each second buckling member comprises a rigidity-varying part at which a rigidity gradually increases toward a rear side.

11. The vehicle-body front structure according to claim 8, wherein each first buckling member comprises a fragile part that is more fragile than a front-side part and a rear-side part, and
wherein each second buckling member comprises a rigidity-varying part at which a rigidity gradually increases toward a rear side.

12. The vehicle-body front structure according to claim 9, wherein each first buckling member comprises a fragile part that is more fragile than a front-side part and a rear-side part, and
wherein each second buckling member comprises a rigidity-varying part at which a rigidity gradually increases toward a rear side.

13. The vehicle-body front structure according to claim 7, wherein each first buckling member comprises a notch formed on an inner side in the left-right direction and a lower and rear side of the corresponding projection, and a bead that is formed on a lower side of the corresponding sub-frame inside the notch in the left-right direction and that extends in the left-right direction.

14. The vehicle-body front structure according to claim 8, wherein each first buckling member comprises a notch formed on an inner side in the left-right direction and a lower and rear side of the corresponding projection, and a bead that is formed on a lower side of the corresponding sub-frame inside the notch in the left-right direction and that extends in the left-right direction.

15. The vehicle-body front structure according to claim 9, wherein each first buckling member comprises a notch formed on an inner side in the left-right direction and a lower and rear side of the corresponding projection, and a bead that is formed on a lower side of the corresponding sub-frame inside the notch in the left-right direction and that extends in the left-right direction.

16. The vehicle-body front structure according to claim 10, wherein each first buckling member comprises a notch formed on an inner side in the left-right direction and a lower and rear side of the corresponding projection, and a bead that is formed on a lower side of the corresponding sub-frame inside the notch in the left-right direction and that extends in the left-right direction.

17. The vehicle-body front structure according to claim 11, wherein each first buckling member comprises a notch formed on an inner side in the left-right direction and a lower and rear side of the corresponding projection, and a bead that is formed on a lower side of the corresponding sub-frame inside the notch in the left-right direction and that extends in the left-right direction.

18. The vehicle-body front structure according to claim 12, wherein each first buckling member comprises a notch formed on an inner side in the left-right direction and a lower and rear side of the corresponding projection, and a bead that is formed on a lower side of the corresponding sub-frame inside the notch in the left-right direction and that extends in the left-right direction.

* * * * *